United States Patent

Castellant et al.

[11] Patent Number: 4,574,619
[45] Date of Patent: Mar. 11, 1986

[54] METHOD FOR DETERMINING THE FLOW RATE OF AIR THROUGH A TURBINE-ENGINE LABYRINTH SEAL

[75] Inventors: Jean-Pierre J. E. Castellant, Chartrettes; Alain G. J. Habrard, Macherin; Jacques E. Pidebois, Saint-Pierre Les Nemours, all of France

[73] Assignee: Societe Nationale d'Etude et de Construction de Meteurs d'Aviation, Paris, France

[21] Appl. No.: 655,061

[22] Filed: Sep. 27, 1984

[30] Foreign Application Priority Data

Oct. 5, 1983 [FR] France .............................. 83 15844

[51] Int. Cl.$^4$ .............................................. G01M 3/28
[52] U.S. Cl. ...................................................... 73/40.7
[58] Field of Search ........................ 73/40.7, 49.8, 46; 277/2, 53

[56] References Cited

U.S. PATENT DOCUMENTS

| 4,028,928 | 6/1977 | Van Dalen et al. | 73/40.7 |
| 4,515,007 | 5/1985 | Herman | 73/40.7 X |

FOREIGN PATENT DOCUMENTS

| 1209078 | 9/1959 | France . | |
| 2272261 | 5/1975 | France . | |
| 1213813 | 11/1970 | United Kingdom | 73/40.7 |

Primary Examiner—Stewart J. Levy
Assistant Examiner—Joseph W. Roskos
Attorney, Agent, or Firm—Bacon & Thomas

[57] ABSTRACT

A method for determining the air flow through a labyrinth seal of a turbine engine is disclosed wherein a constant flow rate of an inert gas is injected into the air discharged through the compressor output labyrinth seal. A portion of the gas mixture is withdrawn a specific distance away from the injection point and the flow rate of the air discharged from the labyrinth seal is calculated by measuring the inert gas content of the sample mixture.

14 Claims, 2 Drawing Figures

METHOD FOR DETERMINING THE FLOW RATE OF AIR THROUGH A TURBINE-ENGINE LABYRINTH SEAL

BACKGROUND OF THE INVENTION

The present invention relates to a method for determining the air flow passing through a turbine-engine laybrinth seal.

In turbine-engine operation, especially those utilized for aircraft propulsion, a number of hitherto inexplicable drawbacks have been encountered. Among these drawbacks is a drop in thrust over variable durations, a propensity towards pumping, depending on the temperature of the turbine-engine, and general performance degradation under ill-defined operating conditions.

It has been suggested that these drawbacks may be attributed to variations in air leaks to one or more of the various labyrinth seals utilized in the turbine-engine structure, in particular those labyrinth seals at the compressor output. A method for precisely measuring the air flow through the various labyrinth seals of the turbine-engine is necessary to analyze the behavior of the engine and to interpret the operational thermodynamic conditions of its turbine at high pressure. Also, knowledge of the air flows through the labyrinth seals enables the more precise definition and improvement of break-in procedures.

SUMMARY OF THE INVENTION

The main object of the present invention is to devise a method for directly measuring the air flow through a labyrinth seal, in particular for a turbine-engine, which method is applicable to both the transient and steady states of the engine operation and requires only slight modifications of the engine structure.

The method according to the invention injects a constant flow of inert gas, such as carbon dioxide into the air flow downstream of the labyrinth seal such that the inert gas is mixed with the air flowing through the seal. At a further downstream location, after the inert gas and air have been homogeneously mixed, a sample portion of the mixture is withdrawn and analyzed to determine the concentration level of the inert gas in the sample.

When the method is utilized to analyze the labyrinth seal of the turbine-engine compressor, the inert gas is injected adjacent to the compressor on the downstream side into the volume defined by the compressor stage and inside casing of the engine combustion chamber, the downstream turbine stage, and the shaft interconnecting the compressor with the turbine. The sample portion of the homogeneous mixture is withdrawn adjacent to the turbine stage on the upstream side.

According to the method of the present invention, the air flow through the compressor output labyrinth seal is easily determined from the concentration of the inert gas of the sample mixture. As an example, if the flow rate of the injected inert gas is 0.03 moles/s and if the analysis of the sample portion shows its inert gas concentration to be 0.3%, it is easily deduced that the air flow through the labyrinth seal is:

0.03/0.003 = 10 moles/s = 290 g of air per second.

The test method of the instant invention may be implemented by injecting any gas provided it is chemically inert with respect to the components of air, however, carbon dioxide is the preferred gas. It is quite available, economical, harmless and capable of being stored in large amounts in the liquid state under a pressure of approximately 50 bars. A bottle of liquified carbon dioxide is a highly advantageous source of injection gas for the method according to the present invention since the inert gas leaving the bottle is at a pressure which depends solely on the ambient temperature—not on the contents of the bottle. Also, the carbon dioxide contents in the sample portion can easily be determined by using gas analyzers which are widely available in test facilities for turbine engines.

Since the air mixed with the carbon dioxide in the implementation of the instant method itself contains a specific fraction of carbon dioxide, the latter must be considered when computing the flow rate of the air through the labyrinth seal by measuring the carbon dioxide concentration in the sample portion.

The method according to the present invention may inject the inert gas into the engine structure and may withdraw the sample portion from the engine structure by using pick-up means which are ordinarily present adjacent the compressor output labyrinth seal and the turbine stage for temperature and pressure instrumentation. Generally, when turbine-engines are tested, whether as prototypes or in other development stages, they contain numerous test pickups for instrumentation which measures temperature and pressure at various locations throughout the engine structure. These pickups are usually in the form of small-diameter tubes, several of which are located at the compressor output labyrinth seal and at the turbine stage. These small-diameter tubes may be utilized to inject the inert gas and to withdraw the sample portion.

DETAILED DESCRIPTION OF THE PREFERRED EMBODIMENTS

Figure 1:
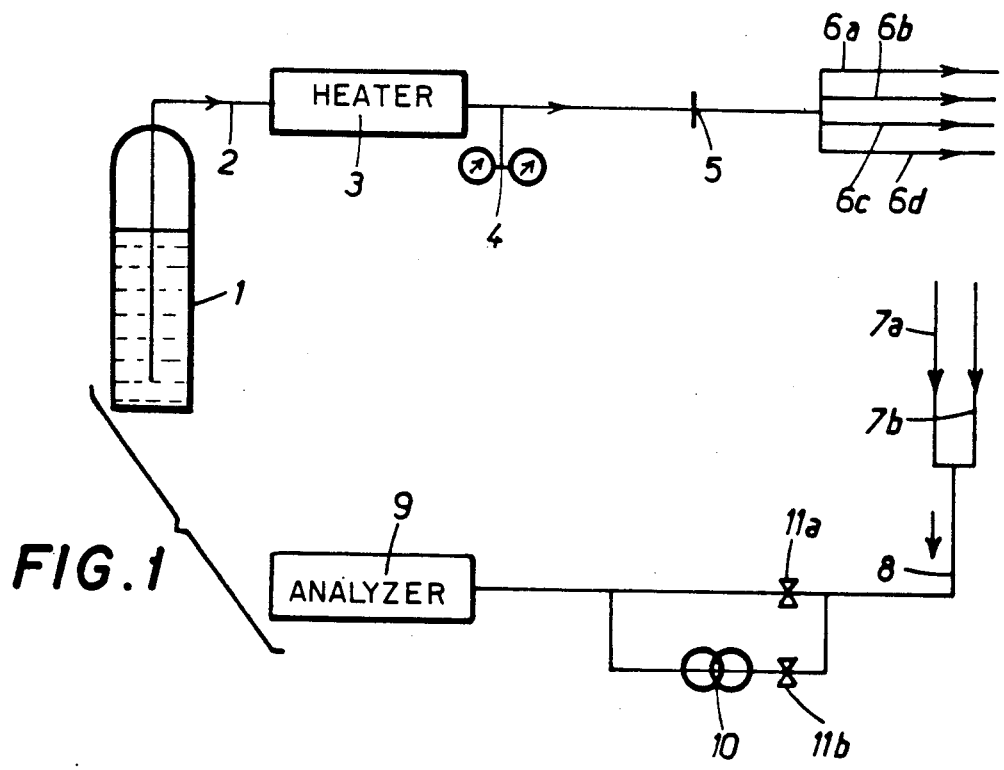
FIG. 1 shows a schematic diagram of the apparatus for carrying out the method according to the invention.

In FIG. 1, a bottle of inert gas is shown at 1, which may contain 15 kg of carbon dioxide at a pressure of 50 bars when the ambient temperature is 15° C. Conduit 2 is connected to the discharge outlet of the bottle 1 and passes the inert gas through a heating system 3, which may be an electrical heater having a power of 500 w. The inert gas passes into an expansion system 4, of known construction, which is adjustable and is generally set in such a manner that the carbon dioxide arrives at diaphragm 5 at an approximate upstream pressure of 25 bars. The diaphragm 5 serves to further reduce the pressure of the gas to approximately 10 bars. At this reduced pressure, the gas passes into the injection tubes 6, which are illustrated as four in number (6a through 6). Although four injection tubes are shown, quite obviously any number of them may be utilized depending upon the precise engine structure. As noted previously, the injection tube 6a–6d may be standard instrumentation pickup tubes already present in the turbine engine as it undergoes its test stages and which are located near the compressor output labyrinth seal. Typically, such small-diameter tubes are less than 1 mm in diameter and are 1 m long. Under these conditions, it can be seen that when the conduit 2 feeds the injection tubes with carbon dioxide at a pressure of 10 bars, the four tubes $6a$–$6d$ inject a total carbon dioxide gas flow of approximately 1.36 g/s into the turbine engine.

FIG. 1 also illustrates two of the approximately seven temperature and/or pressure pickup tubes which are provided near the turbine of the engine at $7a$ and $7b$. Each of the two selected pickups are each 1 m long and have a 1 mm inside diameter. The exterior ends of the pickup tubes are connected in parallel to a single sampling conduit 8 which transfers the gas mixture into analyzer 9. The analyzer 9 is of known construction and is capable of determining the molar fraction of carbon dioxide contained in the gas mixture sampled by the tubes $7a$ and $7b$. In a typical example, the two tubes $7a$ and $7b$ allow sampling a total gas mixture flow of approximately 0.3 g/s when the turbine engine operates at full speed. In that instance, the pressure generated within the engine is enough to force the sampled mixture into the analyzer 9. However, when the turbine engine operates at lower speeds, the sampling portion pressure is only approximately 1.2–1.3 bars. In this instance, an evacuation pump 10 is connected into the conduit 8 by closing valve $11a$ and opening valve $11b$ to draw the sampled mixture through the pickup tubes $7a$ and $7b$ and into the analyzer 9. In such a mode of operation, the flow rate of the gas mixture is approximately 0.06 g/s.

Figure 2:
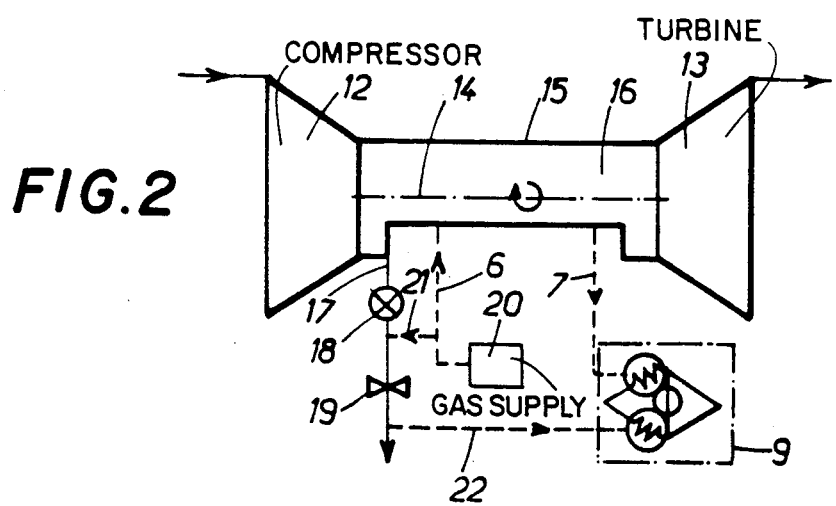
FIG. 2 is a schematic diagram illustrating the method for measuring the air flow through a labyrinth seal of the compressor output of a turbine engine.

In the set-up shown in FIG. 1, a non-negligible overall response time is involved, particularly due to the length of the sampling conduit 8 which may be on the order of 10 m long having an inside diameter of 6 mm. In that event, the response time is approximately 0.6 s at low speed operation and 1 s at full speed. The analyzer 9 itself has a response time of less than 1 s. The pickup tubes, such as $6a$–$6d$, $7a$ and $7b$ can be provided on an engine in standard operating conditions to monitor the changes in the clearances of the labyrinth seal, and to determine a maintenance program for these seals as a function of time. This system is shown in FIG. 2, wherein 12 denotes a compressor stage of the turbine engine and 13 denotes the turbine stage of the engine. 14 is a shaft of the high-pressure stage while 15 denotes the inside casing of the combustion chamber. In many turbine engines, the combustion chamber has an annular shape which is defined by inside and outside casings (not shown). Element 15 schematically indicates the inside casing of such an annular combustion chamber. Element 16 denotes the sealed or enclosed volume bounded by the particular elements 12–15 of the turbine engine.

The block 20 in FIG. 2 schematically illustrates the carbon dioxide source and the supply circuit shown in FIG. 1 (elements 1–4) upstream of the diaphragm 5. In this embodiment, the feed conduit 2 branches into an injection system 6 which may comprise the 4 injection tubes $6a$–$6d$ of FIG. 1. Element 17 denotes a compressed air tubing located upstream of the compressor output labyrinth seal and which is utilized to withdraw a small amount of compressed air from this stage of the engine and to deliver the air to various devices in the aircraft. A regulating valve 18 controls the flow of air through conduit or tube 17 which may be measured by flow meter 19 located downstream of the regulating valve 18.

A tap 21 branches off the injection system 6 and leads into conduit 17 downstream of the regulating valve 18.

The sampling withdrawal system 7 may comprise the two pickup tubes $7a$ and $7b$, as shown in FIG. 1 which may be connected to the volume 16 a slight distance upstream of the high pressure stage of the turbine 13. In this embodiment, the gas mixture analyzer 9 is a differential analyzer of the Wheatstone bridge type and comprises two input tubes which are connected, respectively, to the sampling conduit 7 and to conduit 22. The other end of conduit 22 is connected to the conduit 17 downstream of the flow meter 19 to withdraw a sample of the air/inert gas mixture from conduit 17. Two of the branches of the Wheatstone bridge of the differential analyzer are affected by the gas mixtures fed to them through the conduit 7 and 22, respectively.

The method of the present invention may be carried out utilizing the system shown in FIG. 2 by comparing the flow rates through various of the conduits. $d_1$ is the flow rate of the carbon dioxide supplied from the source 20 and injected through the injection conduit 6 into the enclosure 16; $d_2$ is the flow rate of the carbon dioxide injected through the conduit 21 into the conduit 17 downstream of the regulating valve 18; $D_1$ is the flow rate of the gas mixture sampled in the enclosure 16 by means of conduit 7; and $D_p$ is the flow rate of the gas mixture sampled by the conduit 22 downstream of the flow meter 19. The carbon dioxide is supplied at the same temperature and at the same pressure in conduits 6 and 21, and the flow rates $d_1$ and $d_2$ are calibrated by throttleing means such that the ratio $d_1/d_2$ remains constant and independent of the respective variation in $d_1$ and $d_2$ (the value of the ratio $d_1/d_2$ is previously ascertained under test bench conditions). If, then the regulation valve 18 is adjusted so as to balance the concentration in carbon dioxide in the two gas mixtures circulating in the conduits 7 and 22 with the flow rate $D_1$ and $D_p$, the air flow rate through the output labyrinth seal of the compressor 12 may be calculated by the formula:

$$D_1 = D_p (d_1/d_2) \qquad (1)$$

When the operational conditions of the turbine engine change, the Wheatstone bridge of the differential analyzer 9 becomes unbalanced and must be returned to a balanced condition by the adjustment of the regulating valve 18. The error with respect to the air flow through the labyrinth seal $D_1$ then will not exceed a few percent because it corresponds substantially to the sum of the errors relating to the flows $d_1$, $d_2$ and $D_p$, the latter value obviously being provided by the flowmeter 19.

In a variation of this test method, the differential analyzer 9 may be replaced by a standard analyzer which directly indicates the concentration of the carbon dioxide in the measured gas mixture. The same analyzer may sequentially measure the concentration $C_2$ of the mixture sampled by the conduit means 7 and then the concentration $C_1$ of the mixture circulating in the conduit 17 downstream of regulating valve 18 and the conduit 21. In this instance, the air flow through the labyrinth seal at the output of compressor 12 may be calculated as follows:

$$D_1 = D_p (d_1/d_2)(C_1/C_2) \qquad (2)$$

With this method, it is not necessary to adjust the regulator valve 18 to vary the air flow. However, the test results may encounter an additional error due to the measurements of the concentrations $C_1$ and $C_2$ during rapidly changing transient states of turbine engine, it may be necessary to use two separate analyzers to simultaneously measure the concentrations $C_1$ and $C_2$. However, this may also entail additional errors due to the discrepancy between the calibrations of the two analyzers and to the different response times of the two conduits to which the analyzers are connected.

The results obtained using the method according to the invention are significant during the development of the turbine engine as well as during its service life. During the development stages, the results obtained lead to better knowledge of the high-pressure turbine efficiency and also to a better knowledge of the operational curve of the engine compressor which enable its pumping tendancies to be reduced. During the service life of the engine, the test results will enable the determination of the effectiveness of the labyrinth seal and will determine its service life.

The foregoing descriptions are provided for illustrative purposes only and should not be construed as in any way limiting this invention, the scope of which is defined solely by the dependent claims.

What is claimed is:

1. A method of determining the air flow through a labyrinth seal in a turbine engine comprising the steps of:
   (a) injecting an inert gas into the air flow at a plurality of locations downstream of the labyrinth seal;
   (b) allowing the inert gas and air to form a homogeneous mixture;
   (c) withdrawing a sample portion of the homogeneous mixture at a location downstream of the injection of the inert gas;
   (d) analyzing the sample portion to determine the concentration of the inert gas; and,
   (e) calculating the air flow through the labyrinth seal based upon the concentration of the inert gas in the sample.

2. The method of claim 1 wherein the inert gas is carbon dioxide.

3. The method claim 1 wherein the sample portion is withdrawn from a plurality of locations.

4. The method of claim 3 wherein the sample is withdrawn by creating a vacuum in a probe at the downstream location.

5. The method of claim 3 comprising the additional step of heating the inert gas prior to injecting it into the air flow.

6. The method of claim 5 comprising the additional step of reducing the pressure of the inert gas prior to injecting it into the air flow and after it has been heated.

7. The method of claim 6 wherein the analysis of the homogeneous mixture determines the molar fraction of the inert gas in the mixture.

8. The method of claim 1 wherein the turbine engine has an annular combustion chamber defined by inside and outside casings, a compressor stage upstream of the combustion chamber having a labyrinth seal, a turbine stage downstream of the combustion chamber, and a rotatable shaft interconnecting the compressor stage and the turbine stage and wherein the inert gas is injected adjacent to the compressor on a downstream side.

9. The method of claim 8 wherein the sample portion is a first sample portion and is withdrawn adjacent to the turbine-stage on an upstream side.

10. The method of claim 9 comprising the additional steps of:
    (a) withdrawing a portion of air from upstream of the compressor stage;
    (b) injecting a portion of the inert gas into this upstream air portion so that the air and insert gas form a homogeneous mixture;
    (c) withdrawing a second sample portion from the mixture of the upstream air and the inert gas; and,
    (d) passing the first and second sample portions into a differential analyzer of the Wheatstone bridge type; and,
    (e) adjusting the flow of air from the upstream side of the compressor so that the differential analyzer is balanced.

11. The method of claim 10 wherein the ratio of the flow of the inert gas injected downstream of the compressor to the flow of the inert gas injected into the air withdrawn from upstream of the compressor is constant.

12. The method of claim 9 comprising the additional steps of:
    (a) withdrawing a portion of air from upstream of the compressor stage;
    (b) injecting a portion of the inert gas into the upstream air portion so that the air and inert gas form a homogeneous mixture;
    (c) withdrawing a second sample portion from the mixture of the upstream air and the inert gas;
    (d) sequentially analyzing the first and second sample portions to determine the inert gas concentration in each sample; and,
    (e) calculating the air flow through the labyrinth seal based upon the concentration of inert gas in each sample portion.

13. The method of claim 12 wherein the air flow through the labyrinth seal is calculated according to the formula:

$$D_1 = D_p (d_1/d_2) (C_1/C_2)$$

where:
   $D_1$ = air flow through the labyrinth seal;
   $D_p$ = flow rate of the second sample portion;
   $d_1$ = flow rate of the inert gas injected into the air downstream of the compressor;
   $d_2$ = flow rate of the inert gas injected into the air withdrawn from upstream of the compressor;
   $C_1$ = concentration of the second sample portion;
   $C_2$ = concentration of the first sample portion.

14. The method of claim 8 wherein the inert gas is injected and the sample portion withdrawn through a plurality of test probes on the turbine engine structure.

* * * * *